United States Patent [19]
Tauber

[11] Patent Number: 6,048,019
[45] Date of Patent: Apr. 11, 2000

[54] CAR SECURITY SYSTEM

[76] Inventor: Arkadi Tauber, 15 Briar Ct., Chestnut Ridge, N.Y. 10977

[21] Appl. No.: 09/086,450

[22] Filed: May 28, 1998

[51] Int. Cl.[7] ....................................................... B60N 2/08
[52] U.S. Cl. .................................... 296/65.13; 296/65.01; 248/429; 70/261
[58] Field of Search ............................. 296/65.01, 65.03, 296/65.13, 65.14, 65.15, 65.16, 69; 248/429, 430; 70/261

[56] References Cited

U.S. PATENT DOCUMENTS

| | | | |
|---|---|---|---|
| 3,650,347 | 3/1972 | Campos | 70/261 X |
| 4,733,845 | 3/1988 | Maiwald | 248/429 |
| 4,909,469 | 3/1990 | Nihei et al. | 248/429 |
| 5,234,189 | 8/1993 | Myers | 248/429 |
| 5,412,964 | 5/1995 | Yee | 70/261 |
| 5,628,215 | 5/1997 | Brown | 70/261 |
| 5,644,937 | 7/1997 | Farino | 70/261 |
| 5,676,341 | 10/1997 | Tarusawa et al. | 248/430 |
| 5,918,847 | 7/1999 | Couasnon | 248/430 |

FOREIGN PATENT DOCUMENTS

| | | | |
|---|---|---|---|
| 3042033 | 6/1982 | Germany . | |
| 58-20530 | 2/1983 | Japan . | |
| 1507608 | 9/1989 | U.S.S.R. | 296/65.13 |
| 2059757 | 3/1981 | United Kingdom . | |
| 2102363 | 2/1983 | United Kingdom | 70/261 |

*Primary Examiner*—D. Glenn Dayoan
*Assistant Examiner*—Chad D Wells

[57] ABSTRACT

A new car security system for securing front seats of a vehicle in a forwardmost position. The inventive device includes a pair of tracks secured to a floorboard of a vehicle. The pair of tracks each have a sliding member disposed therein. The sliding member of each of the tracks are secured to an underside of a car seat. An outer edge of an outermost track has a plurality of notches formed therein in a spaced relationship along a length of the track. An adjustment handle is pivotally coupled with a side of the car seat. The adjustment handle is adapted for selective engagement with one of the plurality of notches to preclude movement of the car seat with respect to the pair of tracks. The adjustment handle includes a spring for inward biasing thereof to engage one of the plurality of notches. A lock is provided for precluding movement of the car seat with respect to the pair of tracks.

4 Claims, 3 Drawing Sheets

CAR SECURITY SYSTEM

BACKGROUND OF THE INVENTION

1. Field of the Invention

The present invention relates to automobile anti-theft devices and more particularly pertains to a new car security system for securing front seats of a vehicle in a forwardmost position.

2. Description of the Prior Art

The use of automobile anti-theft devices is known in the prior art. More specifically, automobile anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art automobile anti-theft devices include U.S. Pat. No. 5,213,388 to Baker; U.S. Pat. No. 5,412,964 to Yee; U.S. Pat. No. Des. 354,629 to Chapman; U.S. Pat. No. 5,415,458 to Kim; U.S. Pat. No. 5,251,465 to Kwang; and U.S. Pat. No. 4,116,297 to Ross et al.

While these devices fulfill their respective, particular objectives and requirements, the aforementioned patents do not disclose a new car security system. The inventive device includes a pair of tracks secured to a floorboard of a vehicle. The pair of tracks each have a sliding member disposed therein. The sliding member of each of the tracks are secured to an underside of a car seat. An outer edge of an outermost track has a plurality of notches formed therein in a spaced relationship along a length of the track. An adjustment handle is pivotally coupled with a side of the car seat. The adjustment handle is adapted for selective engagement with one of the plurality of notches to preclude movement of the car seat with respect to the pair of tracks. The adjustment handle includes a spring for inward biasing thereof to engage one of the plurality of notches. A lock is provided for precluding movement of the car seat with respect to the pair of tracks.

In these respects, the car security system according to the present invention substantially departs from the conventional concepts and designs of the prior art, and in so doing provides an apparatus primarily developed for the purpose of securing front seats of a vehicle in a forwardmost position.

SUMMARY OF THE INVENTION

In view of the foregoing disadvantages inherent in the known types of automobile anti-theft devices now present in the prior art, the present invention provides a new car security system construction wherein the same can be utilized for securing front seats of a vehicle in a forwardmost position.

The general purpose of the present invention, which will be described subsequently in greater detail, is to provide a new car security system apparatus and method which has many of the advantages of the automobile anti-theft devices mentioned heretofore and many novel features that result in a new car security system which is not anticipated, rendered obvious, suggested, or even implied by any of the prior art automobile anti-theft devices, either alone or in any combination thereof.

To attain this, the present invention generally comprises a car seat having a horizontal seat portion and a vertical back rest portion. A pair of tracks are secured to a floorboard of a vehicle. The pair of tracks each have a generally U-shaped configuration with inwardly turned free ends. The pair of tracks each have a sliding member disposed therein. The sliding member of each of the tracks are secured to an underside of the horizontal seat portion of the car seat. An outer edge of an outermost track has a plurality of notches formed therein in a spaced relationship along a length of the track. An adjustment handle is provided having a generally L-shaped configuration. The adjustment handle has an inner portion and an outer portion. The inner portion has a first end pivotally coupled with a side of the car seat. The outer portion extends outwardly from a second end of the inner portion. The outer portion has a gripping portion disposed on an outer end thereof. The outer portion has an inner end extending inwardly for selective engagement with one of the plurality of notches to preclude movement of the car seat with respect to the pair of tracks. The adjustment handle includes a spring for inward biasing of the inner end of the outer portion to engage one of the plurality of notches. A lock cylinder is disposed within the side of the car seat. The lock cylinder has a key slot therein for receiving a key. The lock has a downwardly extending portion pivotally coupled therewith in movable communication with the key slot. The downwardly extending portion has a protrusion extending inwardly thereof for engaging one of the plurality of notches when in a locked orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection tile nature and essence of the technical disclosure of the application. The abstract is neither intended to define the invention of the application, which is measured by the claims, nor is it intended to be limiting as to the scope of the invention in any way.

It is therefore an object of the present invention to provide a new car security system apparatus and method which has many of the advantages of the automobile anti-theft devices mentioned heretofore and many novel features that result in a new car security system which is not anticipated, rendered obvious, suggested, or even implied by any of the prior art automobile anti-theft devices, either alone or in any combination thereof.

It is another object of the present invention to provide a new car security system which may be easily and efficiently manufactured and marketed.

It is a further object of the present invention to provide a new car security system which is of a durable and reliable construction.

An even further object of the present invention is to provide a new car security system which is susceptible of a low cost of manufacture with regard to both materials and labor, and which accordingly is then susceptible of low prices of sale to the consuming public, thereby making such car security system economically available to the buying public.

Still yet another object of the present invention is to provide a new car security system which provides in the apparatuses and methods of the prior art some of the advantages thereof, while simultaneously overcoming some of the disadvantages normally associated therewith.

Still another object of the present invention is to provide a new car security system for securing front seats of a vehicle in a forwardmost position.

Yet another object of the present invention is to provide a new car security system which includes a pair of tracks secured to a floorboard of a vehicle. The pair of tracks each have a sliding member disposed therein. The sliding member of each of the tracks are secured to an underside of a car seat. An outer edge of an outermost track has a plurality of notches formed therein in a spaced relationship along a length of the track. An adjustment handle is pivotally coupled with a side of the car seat. The adjustment handle is adapted for selective engagement with one of the plurality of notches to preclude movement of the car seat with respect to the pair of tracks. The adjustment handle includes a spring for inward biasing thereof to engage one of the plurality of notches. A lock is provided for precluding movement of the car seat with respect to the pair of tracks.

Still yet another object of the present invention is to provide a new car security system that precludes a thief from sitting in one of the forward seats.

Even still another object of the present invention is to provide a new car security system that would prevent a thief from gaining access to the vehicles air bags.

These together with other objects of the invention, along with the various features of novelty which characterize the invention, are pointed out with particularity in the claims annexed to and forming a part of this disclosure. For a better understanding of tile invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
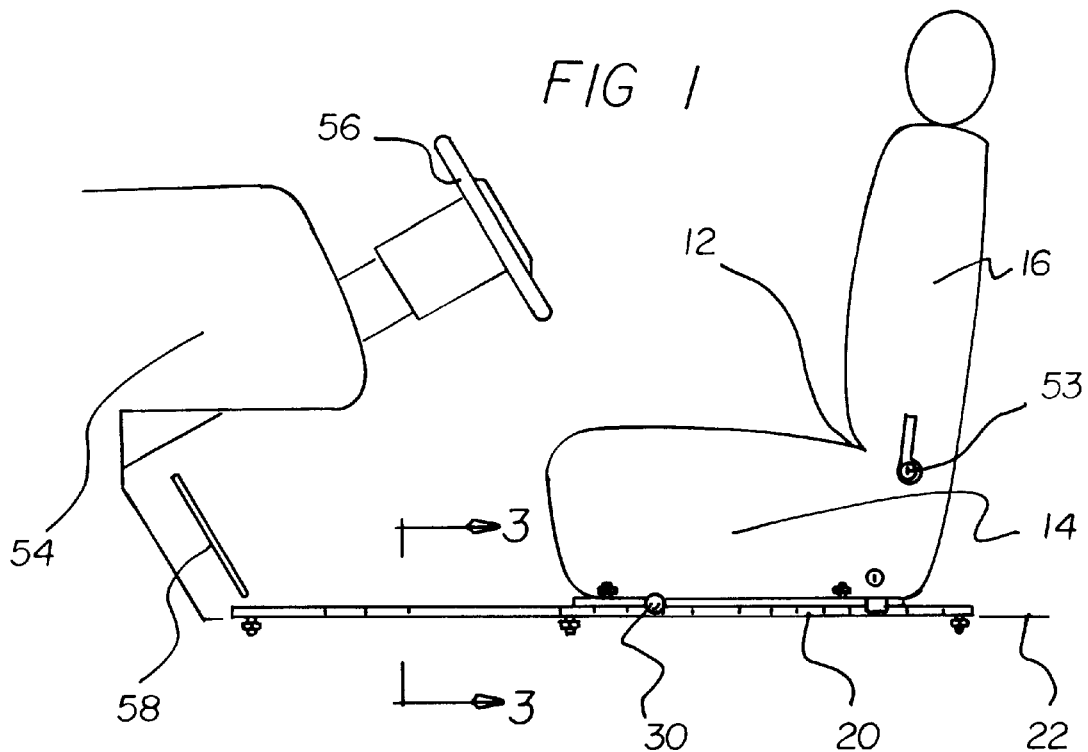
FIG. 1 is a side view of a new car security system according to the present invention.
Figure 2:
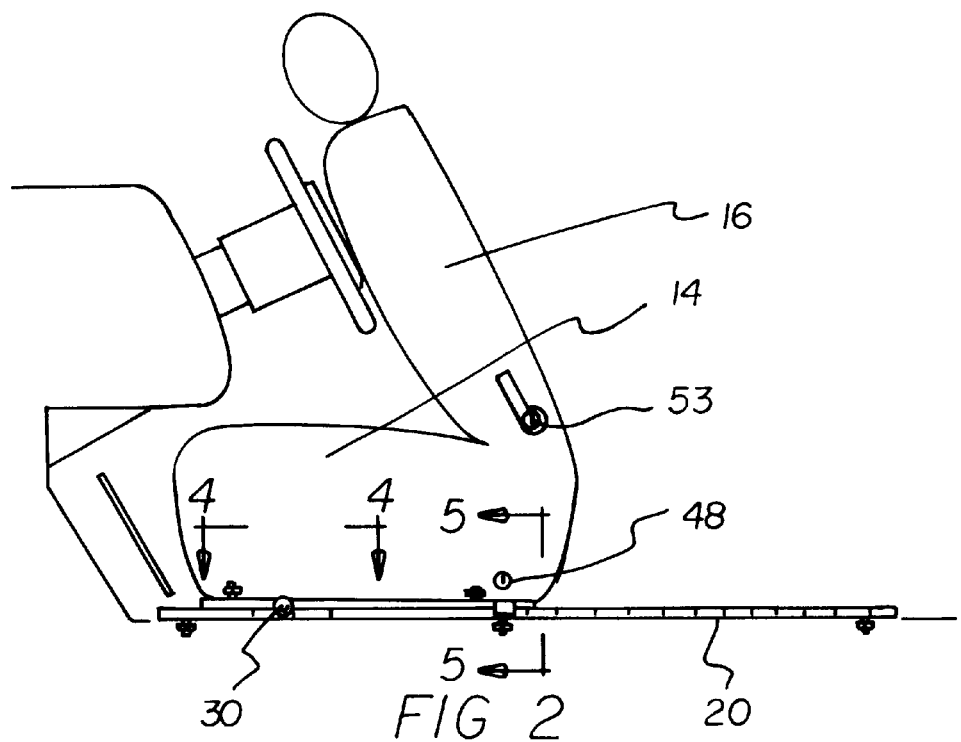
FIG. 2 is a side view of the present invention in a locked orientation .
Figure 3:
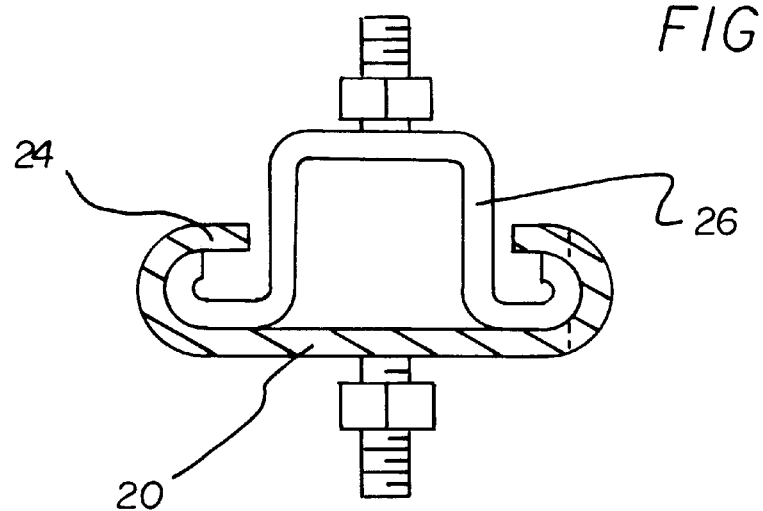
FIG. 3 is a cross-sectional view of the present invention as taken along line 3—3 of FIG. 1.
Figure 4:
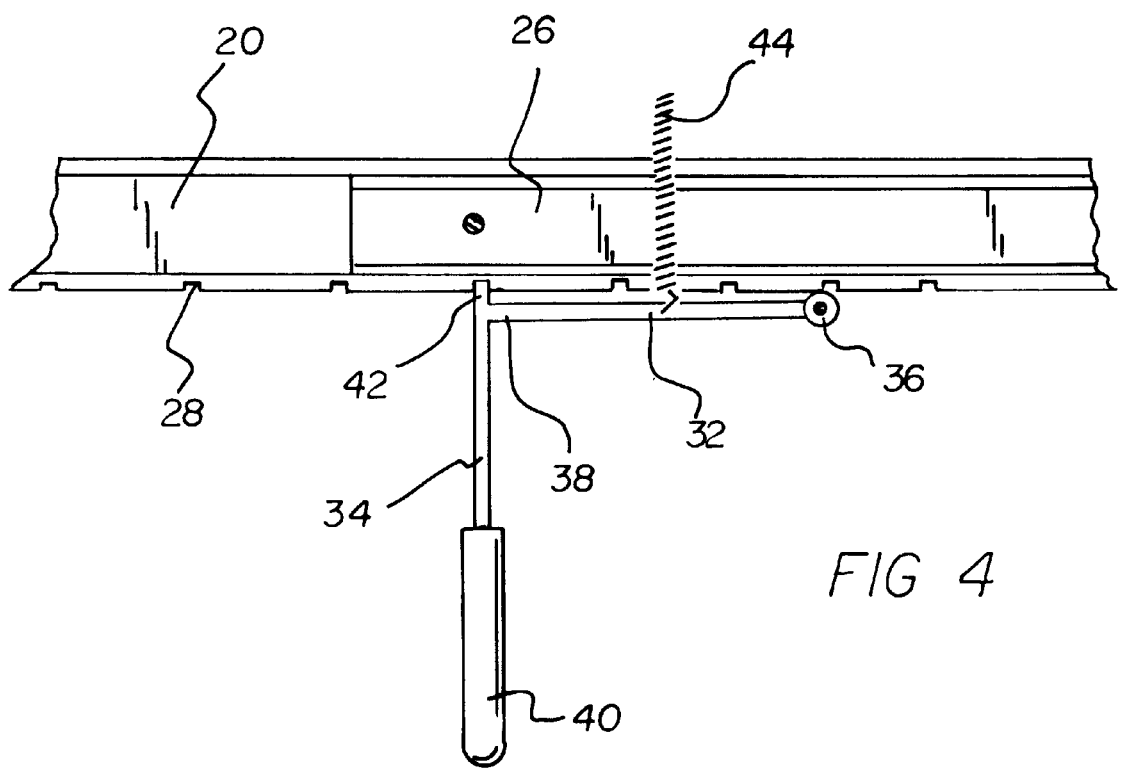
FIG. 4 is a cross-sectional view of the present invention as taken along line 4—4 of FIG. 2.
Figure 5:
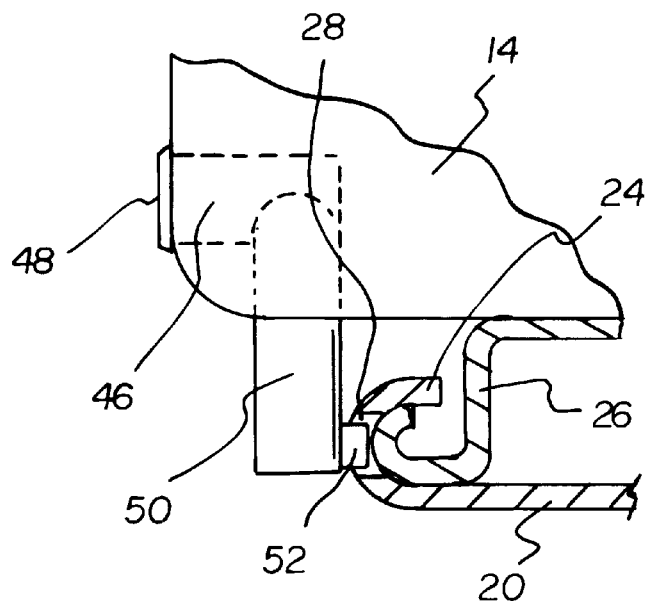
FIG. 5 is a cross-sectional view of the present invention as taken along line 5—5 of FIG. 2.

With reference now to the drawings, and in particular to FIGS. 1 through 6 thereof, a new car security system embodying the principles and concepts of the present invention and generally designated by the reference numeral 10 will be described.

As best illustrated in FIGS. 1 through 6, the car security system 10 comprises a car seat 12 having a horizontal seat portion 14 and a vertical back rest portion 16.

A pair of tracks 20 are secured to a floorboard 22 of a vehicle. The pair of tracks 20 each have a generally U-shaped configuration with inwardly turned free ends 24. The pair of tracks 22 each have a sliding member 26 disposed therein. The sliding member 26 of each of the tracks 20 are secured to an underside of the horizontal seat portion 14 of the car seat 12. An outer edge of an outermost track 20 has a plurality of notches 28 formed therein in a spaced relationship along a length of the track.

An adjustment handle 30 is provided having a generally L-shaped configuration. The adjustment handle 30 has an inner portion 32 and an outer portion 34. Tile inner portion 32 has a first end 36 pivotally coupled with a side of the car seat 12. The outer portion 34 extends outwardly from a second end 38 of the inner portion. The outer portion 34 has a gripping portion 40 disposed on an outer end thereof. The outer portion 34 has an inner end 42 extending inwardly for selective engagement with one of the plurality of notches 28 to preclude movement of the car seat 12 with respect to the pair of tracks 20. The adjustment handle 30 includes a spring 44 for inward biasing of the inner end 42 of the outer portion 34 to engage one of the plurality of notches 28.

A lock cylinder 46 is disposed within the side of the car seat 12. The lock cylinder 46 has a key slot 48 therein for receiving a key. Tile lock cylinder 46 has a downwardly extending portion 50 pivotally coupled therewith in movable communication with the key slot 48. The downwardly extending portion 50 has a protrusion 52 extending inwardly thereof for engaging one of the plurality of notches 28 when in a locked orientation.

A seat lock 53 is disposed in the back rest portion 16 of the car seat 12. The seat lock 53 serving to lock the back rest portion 16 in forward position against a steering wheel 56 of the vehicle.

Figure 6:
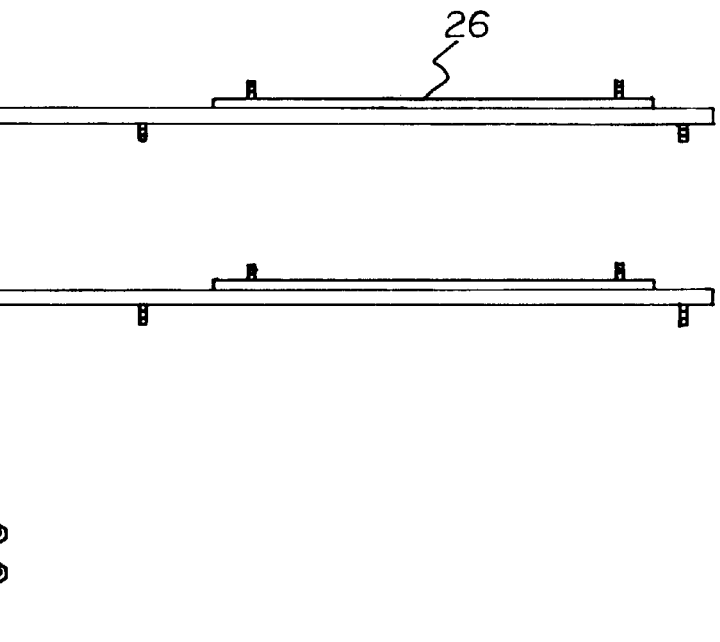
FIG. 6 is a side view of an alternate embodiment of the present invention.

In use, the present invention would secure the seats 12 in the forwardmost position so a thief would be unable to steal the vehicle or remove the air bags. Locking the driver's seat in this position would render the parked vehicle virtually useless to a potential thief since there would be no room to sit down and drive away. The seat portions 14 would slide beneath the dashboard 54, and the seat backs 16 would contact the steering wheel 56 (on driver's side) and dashboard (on passenger's side). When a motorist parks and exits the vehicle interior, the driver's seat could be manually slid forward beneath the dashboard 54 and the key used to lock it in this position. The seat backs 16 would be raised up against the steering wheel 56 and locked with the seat lock 53. A thief breaking into the car would be unable to sit down to operate the foot pedals 58 or steering wheel 56, rendering the vehicle useless. Upon returning to the car, the motorist could unlock the seats 12 and slide them back to the most desirable position. Tile present invention could alternately be designed to operate electrically, pneumatically, or with hydraulic pistons. The present invention could be installed in aftermarket vehicles as well as incorporated into new vehicle production. FIG. 6 illustrates a length of tracks 20 and associated sliding members 26 for securement to an existing car seat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by tile present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A car security system comprising, in combination:
    a car seat having a horizontal seat portion and a vertical back rest portion;
    a pair of tracks secured to a floorboard of a vehicle, the pair of tracks each having a generally U-shaped configuration with inwardly turned free ends, the pair of tracks each having a sliding member disposed therein, the sliding member of each of the tracks secured to an underside of the horizontal seat portion of the car seat, an outer edge of an outermost track having a plurality of notches formed therein in a spaced relationship along a length of the track;
    an adjustment handle having a generally L-shaped configuration, the adjustment handle having an inner portion and an outer portion, the inner portion having a first end pivotally coupled with a side of the car seat, the outer portion extending outwardly from a second end of the inner portion, the outer portion having a gripping portion disposed on an outer end thereof, the outer portion having an inner end extending inwardly for selective engagement with one of the plurality of notches to preclude movement of the car seat with respect to the pair of tracks, the adjustment handle including a spring for inward biasing of the inner end of the outer portion to engage one of the plurality of notches; and
    a lock cylinder disposed within the side of the car seat, the lock cylinder having a key slot therein for receiving a key, the lock cylinder having a downwardly extending portion pivotally coupled therewith in movable communication with the key slot, the downwardly extending portion having a protrusion extending inwardly thereof for engaging one of the plurality of notches when in a locked orientation;
    a seat lock disposed in the back rest portion of the car seat, the seat locking serving to lock the back rest portion in forward position against a steering wheel of the vehicle.

2. A car security system comprising, in combination:
    a pair of tracks secured to a floorboard of a vehicle, the pair of tracks each having a sliding member disposed therein, the sliding member of each of the tracks secured to an underside of a car seat, an outer edge of an outermost track having a plurality of notches formed therein in a spaced relationship along a length of the track;
    an adjustment handle pivotally coupled with a side of the car seat, the adjustment handle adapted for selective engagement with one of the plurality of notches to preclude movement of the car seat with respect to the pair of tracks, the adjustment handle including a spring for inward biasing thereof to engage one of the plurality of notches;
    a lock for precluding movement of the car seat with respect to the pair of tracks; and
    the adjustment handle having a generally L-shaped configuration, the adjustment handle having an inner portion and an outer portion, the inner portion having a first end pivotally coupled with a side of the car seat, the outer portion extending outwardly from a second end of the inner portion, the outer portion having a gripping portion disposed on an outer end thereof, the outer portion having an inner end extending inwardly for selective engagement with one of the plurality of notches.

3. The car security system as set forth in claim 2 wherein the lock is comprised of a lock cylinder disposed within the side of the car seat, the lock cylinder having a key slot therein for receiving a key, the lock cylinder having a downwardly extending portion pivotally coupled therewith in movable communication with the key slot, the downwardly extending portion having a protrusion extending inwardly thereof for engaging one of the plurality of notches when in a locked orientation.

4. A car security apparatus for securing front car seats of a vehicle in a forwardmost position, said apparatus comprising:
    a pair of tracks for securing to a floorboard of the vehicle, the pair of tracks each having a sliding member disposed therein, the sliding member of each of the tracks being adapted for securing to an underside of the car seat, an outer edge of an outermost track having a plurality of notches formed therein in a spaced relationship along a length of the track;
    an adjustment handle for pivotally coupling to a side of the car seat, the adjustment handle adapted for selective engagement with one of the plurality of notches to preclude movement of the car seat with respect to the pair of tracks, the adjustment handle including a spring for inward biasing thereof to engage one of the plurality of notches;
    a lock for precluding movement of the car seat with respect to the pair of tracks; and
    the lock comprising a lock cylinder for disposing in the side of the car seat, the lock cylinder having a key slot therein for receiving a key, the lock cylinder having a downwardly extending portion pivotally coupled therewith in movable communication with the key slot, the downwardly extending portion having a protrusion extending inwardly thereof for engaging one of the plurality of notches when in a locked orientation.

* * * * *